(12) United States Patent
Jin et al.

(10) Patent No.: US 10,645,506 B2
(45) Date of Patent: May 5, 2020

(54) ELECTRONIC DEVICE AND MUSIC VISUALIZATION METHOD THEREOF

(71) Applicant: SAMSUNG ELECTRONICS CO., LTD., Suwon-si, Gyeonggi-do (KR)

(72) Inventors: Jang-ho Jin, Hwaseong-si (KR); Myung-jae Kim, Suwon-si (KR); Ji-hun Park, Seoul (KR); Young-jun Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/268,556

(22) Filed: Feb. 6, 2019

(65) Prior Publication Data
US 2019/0174242 A1 Jun. 6, 2019

Related U.S. Application Data

(63) Continuation of application No. 15/285,834, filed on Oct. 5, 2016, now Pat. No. 10,237,669.

(30) Foreign Application Priority Data

Oct. 7, 2015 (KR) .................. 10-2015-0140874

(51) Int. Cl.
*G08B 3/00* (2006.01)
*H04R 29/00* (2006.01)
(Continued)

(52) U.S. Cl.
CPC ............ *H04R 29/008* (2013.01); *A63J 17/00* (2013.01); *G06F 16/4393* (2019.01);
(Continued)

(58) Field of Classification Search
CPC ............ H04R 29/008; G06F 17/30056; G06F 3/04847; G06T 13/205; G06T 13/80;
(Continued)

(56) References Cited

U.S. PATENT DOCUMENTS 7,297,860 B2 11/2007 Decuir
10,148,242 B2 * 12/2018 Kim ..................... H04S 7/305
(Continued)

FOREIGN PATENT DOCUMENTS

JP 2006-330624 12/2006
JP 2010-139946 6/2010
(Continued)

OTHER PUBLICATIONS

European Office Action dated Dec. 17, 2018 from European Patent Application No. 16192477.4, 6 pages.
(Continued)

*Primary Examiner* — Dhaval V Patel
(74) *Attorney, Agent, or Firm* — Staas & Halsey LLP

(57) ABSTRACT

An electronic device and a method for controlling the electronic device, the method including receiving an input of a command to reproduce music contents, determining audio characteristics information on the music contents and situation information on an environment where the music contents are being reproduced; and displaying a visualization effect of visualizing the music contents using the audio characteristics information and the situation information, and reproducing the music contents.

20 Claims, 11 Drawing Sheets

(51) Int. Cl.
    *A63J 17/00*     (2006.01)
    *G10H 1/00*     (2006.01)
    *G06T 13/20*     (2011.01)
    *G06F 16/438*     (2019.01)
    *G06T 13/80*     (2011.01)
    *G06F 3/0484*     (2013.01)
    *G06T 11/00*     (2006.01)

(52) U.S. Cl.
    CPC ............ *G06T 13/205* (2013.01); *G06T 13/80* (2013.01); *G10H 1/00* (2013.01); *G06F 3/04847* (2013.01); *G06T 11/001* (2013.01); *G10H 1/0025* (2013.01); *G10H 2210/076* (2013.01); *G10H 2220/021* (2013.01); *G10H 2220/081* (2013.01); *G10H 2240/085* (2013.01)

(58) Field of Classification Search
    CPC .. G06T 11/001; G10H 1/00; G10H 2220/081; G10H 2210/076; G10H 2240/085; G10H 2220/021; G10H 1/0025; A63J 17/00
    See application file for complete search history.

(56) References Cited

U.S. PATENT DOCUMENTS

| | | |
|---|---|---|
| 2005/0275626 A1 | 12/2005 | Mueller et al. |
| 2007/0109291 A1 | 5/2007 | Hoshino |
| 2008/0190269 A1 | 8/2008 | Eom et al. |
| 2009/0067605 A1 | 3/2009 | Holm et al. |
| 2010/0082661 A1 | 4/2010 | Beaudreau |
| 2011/0015765 A1 | 1/2011 | Haughay, Jr. et al. |
| 2011/0096073 A1 | 4/2011 | Adhikari et al. |
| 2012/0124473 A1 | 5/2012 | Kim et al. |
| 2015/0020094 A1* | 1/2015 | Moon .................. H04N 21/478 725/32 |

FOREIGN PATENT DOCUMENTS

| | | |
|---|---|---|
| KR | 10-0852196 | 8/2008 |
| KR | 10-2010-0114247 | 10/2010 |
| KR | 10-2012-0051343 | 5/2012 |
| KR | 10-2015-0055262 | 5/2015 |
| KR | 10-1520572 | 5/2015 |

OTHER PUBLICATIONS

European Office Action dated Mar. 15, 2018, in corresponding European Patent Application No. 16192477.4, 6 pgs.
European Office Action dated Aug. 24, 2017 in European Patent Application No. 16192477.4.
Extended European Search Report dated Feb. 24, 2017 in European Patent Application No. 16192477.4.
Nuria Oliver et al., "PAPA: Physiology and Purpose-Aware Automatic Playlist Generation", XP007910448, 2006, 4 pages.
Mohammed R Alhamid et al., "Towards context-sensitive collaborative media recommender system", Multimed Tools Appl, 2015, 30 pages.
Stéphane Dupont et al., "AudioCycle: Browsing Musical Loop Libraries", 2009 Seventh International Workshop on Content-Based Multimedia Indexing, 2009, 9 pages.
U.S. Office Action dated Aug. 17, 2017 from U.S. Appl. No. 15/285,834.
U.S. Office Action dated Feb. 2, 2018 from U.S. Appl. No. 15/285,834.
U.S. Advisory Action dated Apr. 24, 2018 from U.S. Appl. No. 15/285,834.
U.S. Notice of Allowance dated Oct. 29, 2018 from U.S. Appl. No. 15/285,834.
U.S. Appl. No. 15/285,834, filed Oct. 5, 2016, Jang-ho Jin, Samsung Electronics Co., Ltd.
European Office Action dated Nov. 7, 2019 from European Patent Application No. 16192477.4, 4 pages.
European Office Action dated Mar. 18, 2020 from European Patent Application No. 16192477.4, 45 pages.

\* cited by examiner

FIG. 4

PRESET 1 — 400-1

| WEATHER | TIME | DATE | BRIGHTNESS | LIST ATTRIBUTES |
|---|---|---|---|---|
| ○ CLEAR | ○ BEFORENOON | ○ WEEKDAY | ● OUTDOOR | ● MOOD 1 |
| ● CLOUDY | ○ AFTERNOON | ○ HOLIDAY | ○ INDOOR | ○ MOOD 2 |
| ○ OTHERS | ● EVENING | ● WEEKEND | ○ DARK | ○ HIGHLIGHT |
| ○ ..... | ○ ..... | ○ ..... | ○ ..... | ○ ..... |

⋮

PRESET N — 400-N

| WEATHER | TIME | DATE | BRIGHTNESS | LIST ATTRIBUTES |
|---|---|---|---|---|
| ● CLEAR | ○ BEFORENOON | ● WEEKDAY | ○ OUTDOOR | ○ MOOD 1 |
| ○ CLOUDY | ● AFTERNOON | ○ HOLIDAY | ○ INDOOR | ● MOOD 2 |
| ○ OTHERS | ○ EVENING | ○ WEEKEND | ● DARK | ● HIGHLIGHT |
| ○ ..... | ○ ..... | ○ ..... | ○ ..... | ○ ..... |

ELECTRONIC DEVICE AND MUSIC VISUALIZATION METHOD THEREOF

CROSS-REFERENCE TO RELATED APPLICATIONS

This application is a continuation of U.S. patent application Ser. No. 15/285,834, filed on Oct. 5, 2016, in the U.S. Patent and Trademark Office and claims priority from Korean Patent Application No. 10-2015-0140874, filed on Oct. 7, 2015, in the Korean Intellectual Property Office, the disclosures of which are incorporated herein by reference in their entirety.

BACKGROUND

1. Field

Apparatuses and methods consistent with the present disclosure relate to an electronic device and a music visualization method thereof, and more particularly, to an electronic device configured to display a visualization effect of visualizing music contents, and a music visualization method thereof.

2. Description of the Related Art

In listening to music, recent music listeners seek not only auditory pleasure but also visual pleasure that reflect the characteristics of the music, and in order to satisfy such needs, conventional music reproducing apparatuses provide visual effects that fit the characteristics of the music, thereby providing fun elements in listening to the music.

For example, conventional music reproducing apparatuses extract characteristics such as beat, tempo, onset and the like through signal processing in time or frequency areas of sound source data, and using these extracted characteristics, provide visual effects such as flickering LED or changing motions of animation in step with strong beats when reproducing the music.

However, since such visual effects of music reproducing apparatuses use only the characteristics of the music itself, when listening to the same music or music with a similar atmosphere, always a same or very similar visual effects are provided, and the colors or motions of the visual effect itself may easily become monotonous.

SUMMARY

Additional aspects and/or advantages will be set forth in part in the description which follows and, in part, will be apparent from the description, or may be learned by practice of the embodiments.

A purpose of the present disclosure is to resolve the aforementioned problems of prior art, that is, to provide an electronic device that reflects the environment where music contents are being reproduced in the visualization effects of visualizing the music contents, and a music contents visualization method thereof.

According to an embodiment of the present disclosure, there is provided a music contents visualization method of an electronic device, the method including receiving an input of a command to reproduce music contents; determining audio characteristics information on the music contents and situation information on an environment where the music contents are being reproduced; and displaying a visualization effect of visualizing the music contents using the audio characteristics information and the situation information, and reproducing the music contents.

Further, the reproducing may include determining the visualization effect corresponding to the audio characteristics information; changing the determined visualization effect based on the situation information; and displaying the changed visualization effect as the visualization effect of visualizing the music contents.

Further, the visualization effect corresponding to the audio characteristics information may be an image effect where a basic image of a certain theme changes according to the audio characteristics information, and the changing of the determined visualization effect based on the situation information may change at least one of a basic image, a background, a color, a brightness, a chroma, a speed of change and a range of change of the visualization effect corresponding to the audio characteristics information based on the situation information.

Further, the visualization effect corresponding to the audio characteristics information may be a visual effect where light emission of at least one LED (Light Emitting Diode) lamp changes according to the audio characteristics information, and the changing of the determined visualization effect based on the situation information may change at least one of a color, a brightness, a chroma, a contrast, a speed of change and a range of change of the visualization effect corresponding to the audio characteristics information based on the situation information.

Further, the audio characteristics information may include at least one of beat information, mood information and highlight information of the music contents, and the situation information may include at least one of weather information, date information, time information, information on a brightness of an area surrounding the electronic device and information on attributes of a reproducing list.

Further, the method may further include displaying a mode selecting UI (user interface) for selecting one of a simple visualization mode that uses only the audio characteristics information and a smart visualization mode that uses the audio characteristics information and the situation information, wherein when the simple visualization mode is selected from the mode selecting UI, the visualization effect of visualizing the music contents using only the audio characteristics information may be displayed, and when the smart visualization mode is selected, the visualization effect of visualizing the music contents using the audio characteristics information and the situation information may be displayed.

Further, the method may include determining the visualization effect set through a simple visualization setting UI for setting the visualization effect corresponding to the audio characteristics information as the visualization effect corresponding to the audio characteristics information; and changing the visualization effect corresponding to the audio characteristics information using the situation information selected through a smart visualization setting UI for selecting the situation information being used to change the visualization effect corresponding to the audio characteristics information.

Further, the method may further include receiving information on the visualization effect set through the simple visualization setting UI and information on the situation information selected through the smart visualization setting UI from an external device.

Further, the determining the situation information may determine the situation information in real time while the music contents are being reproduced, and the changing of the visualization effect may reflect the situation information determined in real time to change the visualization effect corresponding to the audio characteristics information.

Further, the determining of the situation information may determine the situation information at a time point when the command to reproduce the music contents is input, and the changing of the visualization effect may select a visualization effect changing method corresponding to the situation information at the time point when the command to reproduce the music contents is input from a prestored table where the visualization effect changing method according to the situation information is matched and apply the selected visualization effect changing method to the determined visualization effect.

According to another embodiment of the present disclosure, there is provided an electronic device including an inputter configured to receive a user's command; an audio outputter configured to reproduce music contents; a visualization effect display configured to display a visualization effect of visualizing the music contents; and a processor configured to, when the command to reproduce the music contents is input through the inputter, determine audio characteristics information on the music contents and situation information on an environment where the music contents are being reproduced, control the visualization effect display to display the visualization effect of visualizing the music contents using the audio characteristics information and the situation information, and control the audio outputter to reproduce the music contents.

Further, the processor may determine the visualization effect corresponding to the audio characteristics information, change the determined visualization effect based on the situation information, and control the visualization effect display to display the changed visualization effect as the visualization effect of visualizing the music contents.

Further, the visualization effect display may include a display, and the visualization effect corresponding to the audio characteristics information is an image effect where a basic image of a certain theme changes according to the audio characteristics information, and the processor may change at least one of a basic image, a background, a color, a brightness, a chroma, a speed of change and a range of change of an image effect corresponding to the audio characteristics information based on the situation information.

Further, the visualization effect display may include at least one LED (Light Emitting Diode) lamp, the visualization effect corresponding to the audio characteristics information may be a visual effect where light emission of the at least one LED lamp changes according to the audio characteristics information, and the processor may change at least one of a color, a brightness, a chroma, a contrast, a speed of change and a range of change of the visualization effect corresponding to the audio characteristics information based on the situation information.

Further, the audio characteristics information may include at least one of beat information, mood information and highlight information of the music contents, and the situation information may include at least one of weather information, date information, time information, information on a brightness of an area surrounding the electronic device and information on attributes of a reproducing list.

Further, the processor may control the visualization effect display to display the visualization effect of visualizing the music contents using only the audio characteristics information in a simple visualization mode, and to display the visualization effect of visualizing the music contents using the audio characteristics information and the situation information in a smart visualization mode, of the simple visualization mode of using only the audio characteristics information and the smart visualization mode of using the audio characteristics information and the situation information.

Further, the processor may determine the visualization effect set through the simple visualization setting UI for setting the visualization effect corresponding to the audio characteristics information as the visualization effect corresponding to the audio characteristics information, and change the visualization effect corresponding to the audio characteristics information using the situation information selected through a smart visualization setting UI for selecting the situation information to be used to change the visualization effect corresponding to the audio characteristics information.

Further, the electronic device may further include a communicator configured to communicate with an external device, wherein the processor controls the visualization effect display to, when information on the visualization effect set through the simple visualization setting UI and information on the situation information selected through the smart visualization setting UI are received from the external device, display the visualization effect of visualizing the music contents using the received information.

Further, the processor may determine in real time the situation information while the music contents are being reproduced, and reflect the situation information determined in real time to change the visualization effect corresponding to the audio characteristics information.

Further, the processor may determine the situation information at a time point when the command to reproduce the music contents is input, select a visualization effect changing method corresponding to the situation information at the time point the command to reproduce the music contents is input from a prestored table where the visualization effect changing method according to the situation information is matched, and apply the selected visualization effect changing method to the determined visualization effect.

According to an additional embodiment of the present disclosure, there is provided a non-transitory computer readable storage storing a method the including a music contents visualization method of an electronic device, the method including: receiving an input of a command to reproduce music contents; determining audio characteristics information of the music contents and situation information in an environment where the music contents are being reproduced; and displaying a visualization effect of visualizing the music contents using the audio characteristics information and the situation information, and reproducing the music contents.

According to the aforementioned various embodiments of the present disclosure, the visualization effects of visualizing music contents may change according to the environment where the music contents are being reproduced. Accordingly, a user may experience various music contents visualization effects even when listening to the same music contents or music contents of a similar atmosphere.

BRIEF DESCRIPTION OF THE DRAWINGS

The above and/or other aspects of the present embodiments will be more apparent by describing certain embodiments of the present disclosure with reference to the accompanying drawings, in which:

FIG. 4 is an exemplary view of tables where a visualization effect changing method according situation information is matched according to an embodiment of the present disclosure;

DETAILED DESCRIPTION

Figure 1:
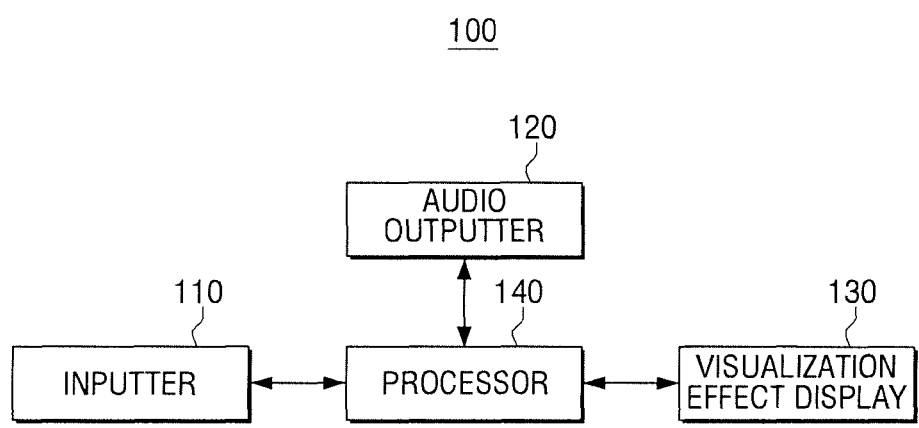
FIG. 1 is a block diagram of an electronic device according to an embodiment of the present disclosure.

Reference will now be made in detail to the embodiments, examples of which are illustrated in the accompanying drawings, wherein like reference numerals refer to the like elements throughout. The embodiments are described below to explain the present embodiments by referring to the figures.

In explaining the present disclosure, when it is deemed that specific explanation on a related well known technology may unnecessarily obscure the main point of the present disclosure, detailed explanation of the related well known technology will be omitted. Further, the suffix "unit" of an element in the explanation hereinafter is used for the sake of convenience of writing the specification, and thus, the suffix "unit" itself does not have a different meaning or role.

Hereinafter, "unit" refers to a software element or a hardware element such as FPGA and ASIC, and performs certain functions. However, "unit" is not limited to software or hardware. "Unit" may consist of a storage medium having an address, and may be configured to be executed by one or more processors. Therefore, "unit" includes elements such as software elements, object-oriented software elements, class elements and operation elements, and processes functions, attributes, procedures, sub routines, sections of program codes, drivers, firmware, micro codes, circuits, data, databases, tables, arrays and variables. Functions provided by elements and units may be combined into a smaller number of elements and units, and may be divided into a greater number of elements and units.

Hereinafter, various embodiments of the present disclosure will be explained with reference to the drawings attached. FIG. 1 is a block diagram illustrating a configuration of an electronic device according to an embodiment of the present disclosure. Referring to FIG. 1, the electronic device 100 includes an inputter 110, an audio outputter 120, a visualization effect display 130 and a processor 140.

The inputter 110 is a configuration, such as a keyboard or touch screen, for receiving a user's command for manipulating the electronic device 100. Especially, the inputter 110 may receive a user's command to reproduce music contents. Further, the inputter 110 may receive a user's command for selecting a mode on a mode selecting UI displayed on the display 130 as will be explained hereinafter, and receive a user's command for making various settings such as a simple visualization setting UI and a smart visualization setting UI.

For this purpose, the inputter 110 may include a button provided in the electronic device 100, a touch panel (in the case where the display 130 is realized as a touch screen), or a remote control signal receiver (in the case where the electronic device 100 is controlled by an external remote control, not illustrated), etc.

The audio outputter 120, such as a speaker system, outputs audio signals. Especially, the audio outputter 120 may reproduce music contents according to a control by the processor 140. For this purpose, the audio outputter 120 may include a speaker, and an audio output terminal, etc. Here, the music contents may be obtained from various sources such as sound sources stored in an external storage device such as a USB, a CD player, DVD player and the like or stored in a storage (not illustrated) of the electronic device 100, or sound sources being provided from sound source servers operated by contents providers (CP).

The visualization effect display 130 may display a visualization effect of visualizing the music contents.

Here, the visualization effect of visualizing the music contents refers to an effect of visually expressing certain music contents that the processor 140 generated using at least one of audio characteristics of the music contents and situation information on an environment where the music contents are being reproduced.

For this purpose, the visualization effect display 130 may be realized in various types of displays such as an LCD (Liquid Crystal Display), OLED (Organic Light Emitting Diodes), PDP (Plasma Display Panel), or in a touch screen that includes a touch panel.

In this case, the visualization effect display 130 may display a mode selecting UI for selecting one of the simple visualization mode and the smart visualization mode, a simple visualization setting UI for setting an image effect corresponding to the audio characteristics information of the music contents, and a smart visualization setting UI for selecting the situation information being used to change the image effect corresponding to the audio characteristics information, according to a control by the processor 140.

Here, the simple visualization mode refers to a mode that displays the image effect of visualizing the music contents using only the audio characteristics of the music contents, and the smart visualization mode refers to a mode that displays the image effect of visualizing the music contents using the situation information on the environment the music contents are being reproduced as well as the audio characteristics.

Meanwhile, according to an embodiment, the visualization effect display 130 may be realized as at least one LED (Light Emitting Diode) lamp. Here, the at least one LED lamp may be arranged near the audio outputter 120, but there is no limitation thereto.

The processor 140 controls the overall operations of the electronic device 100. Especially, when a command to reproduce the music contents is input through the inputter 110, the processor 140 may determine the audio characteristics information on the music contents and the situation information on the environment where the music contents are being reproduced.

For example, when the command to reproduce the music contents is input, the processor 140 may check the music contents for which the command to reproduce is input, and determine the audio characteristics information on the music contents for which the command to reproduce is input of among a plurality of pre-stored audio characteristics information on the music contents. Here, the plurality of pre-stored audio characteristics information on the music contents may be information obtained from an external device (for example, a server) that provides audio characteristics information on music contents.

Further, according to an embodiment, when a command to reproduce music contents is input, the processor 140 may analyze the corresponding music contents and determine the audio characteristics information on the music contents. In this case, the processor 140 may determine the audio characteristics information on the music contents first and then reproduce the music contents, or determine the audio characteristics information in real time while reproducing the music contents.

Further, according to another embodiment of the present disclosure, even before a command to reproduce music contents is input, the processor 140 may analyze the music contents in advance and obtain the audio characteristics information on the corresponding music contents, and then when a user's command to reproduce the music contents is input, the processor 140 may determine the audio characteristics information on the music contents for which the command to reproduce is input. That is, for example, in the case where at least one music contents are included in a reproducing list, the processor 140 may analyze the sound source of the at least one music contents included in the reproducing list, and obtain and store the audio characteristics information on each music contents, and thereafter, when a command to reproduce a certain music contents is input, the processor 140 may determine the audio characteristics information on the music contents for which the user's command to reproduce is input of among the audio characteristics information on the at least one music contents obtained.

Here, the audio characteristics information on the music contents may include at least one of beat information, mood information and highlight information on the music contents. However, there is no limitation thereto, and thus, the audio characteristics information may be any audio characteristics information such as tempo information, onset information and the like as long as it may be used to visualize and display the music contents.

Further, when a command to reproduce music contents is input, the processor 140 may determine situation information on the environment where the music contents is being reproduced. Specifically, when the command to reproduce the music contents is input, the processor 140 may determine the situation information on the environment where the music contents are being reproduced at the time point when the command to reproduce the music contents is input. Further, according to an embodiment, the processor 140 may determine in real time the situation information while the music contents are being reproduced.

Here, the situation information on the environment where the music contents are being reproduced may include at least one of weather information, date information, time information, information on a brightness of an area surrounding the electronic device and information on attributes of a reproducing list. However, there is no limitation thereto, and thus according to an embodiment of the present disclosure, information on conditions of the user of the electronic device and the like may be included in the situation information as well.

Specifically, the processor 140 may obtain the situation information from an external device such as a server, a mobile device and the like, various sensors (not illustrated) and clock (not illustrated) and the like provided in the electronic device 100. Further, the processor 140 may store or update the situation information obtained as aforementioned. Accordingly, when a command to reproduce music contents is input, the processor 140 may specify the time point when the command to reproduce the music contents is input, and determine the situation information of the certain time point from the situation information stored or updated in the electronic device 100.

Further, the processor 140 may obtain in real time the situation information from the external device, sensor, clock and the like. Therefore, the processor 140 may determine in real time the situation information while the music contents are being reproduced according to the user's command to reproduce the music contents.

Meanwhile, the processor 140 may display a visualization effect of visualizing the music contents for which the command to reproduce is input using the audio characteristics information and the situation information determined as aforementioned, and reproduce the corresponding music contents. Here, the displaying of the visualization effect of visualizing the music contents and the reproducing of the music contents may be synchronized and performed simultaneously.

Specifically, the processor 140 may determine the visualization effect corresponding to the audio characteristics information on the music contents, change the determined visualization effect based on the situation information, and control the visualization effect display 130 to display the changed visualization effect as the visualization effect of visualizing the corresponding music contents. Here, the visualization effect corresponding to the audio characteristics information may be an image effect where a basic image of a certain theme changes according to the form of the visualization effect display 130, or a visualization effect where light emission of at least one LED lamp changes according to the audio characteristics information.

For example, in the case where the visualization effect display 130 includes a display, when a command to reproduce music contents is input in a state where a bar graph image is set as the basic image of a certain theme, the processor 140 may determine the image effect where the audio characteristics information determined for the corresponding music contents is reflected in the bar graph as the visualization effect corresponding to the audio characteristics information.

More specifically, the processor 140 may reflect an energy level per frequency band of the sound source corresponding to the corresponding music contents in the bar graph, and determine the energy level per frequency band changing according to time when the sound source is being reproduced expressed in changes in the bar graph as the visualization effect corresponding to the audio characteristics information on the corresponding music contents.

Accordingly, the processor 140 may change the determined image effect based on the situation information. Specifically, the processor 140 may change at least one of a basic image, background, color, brightness, chroma, speed of change and range of change of the image effect determined as the visualization effect corresponding to the audio characteristics information based on the situation information.

Specifically, in the aforementioned example of the bar graph image effect, the processor 140 may, for example, change the environment of the bar graph image according to the weather information, or change the length of the bar graph or the changing range of color according to the time information.

Meanwhile, in the case where the visualization effect display 130 includes at least one LED lamp according to another embodiment of the present disclosure, when a command to reproduce music contents is input, the processor 140 may determine the visualization effect corresponding to the audio characteristics information on the corresponding music contents, for example, the visualization effect of changing light emission of at least one LED according to at least one of beat information, mood information and highlight information of the corresponding music contents. Further, the processor 140 may change at least one of a color, brightness, chroma, contrast, speed of change and range of change of the visual effect determined using the situation information.

For example, in the case where the visualization effect display is realized in a form where six (6) LEDs surround a circular speaker, when a command to reproduce music contents is input, the processor 140 may determine the visualization effect of changing light emission of the LEDs according to the audio characteristics information on the corresponding music contents. More specifically, for example, the processor 140 may determine the visualization effect of flickering a red LED to the beat according to the mood information and beat information of the corresponding music contents.

Accordingly, the processor 140 may change the determined visual effect based on the situation information. Specifically, for example, the processor 140 may change the determined visual effect such that the color of the LED changes continuously between blue, yellow and green according to the weather information, or that the brightness or chroma of the color changes according to the information on the brightness of the surrounding area, or that the range or speed of color changes according to the time information.

However, the method for changing the visualization effect corresponding to the audio characteristics information based on the visualization effect corresponding to the audio characteristics information on the music contents or based on the situation information is of course not limited to the aforementioned example.

Meanwhile, according to another embodiment of the present disclosure, the processor 140 may select the visualization effect changing method corresponding to the situation information at the time point when the reproduce command is input from the table where the visualization effect changing method according to situation information is matched, and apply the selected visualization effect changing method to change the visualization effect corresponding to the audio characteristics information.

FIG. 4 is an example of the table where the visualization method changing method according to situation information is matched. Preset 1 400-1 to Preset N 400-N in FIG. 4 represent a table where different visualization effect changing methods are matched according to combinations of the situation information such as the weather, time, date, brightness and list attributes.

Therefore, for example, in the case where it is determined that the weather information is cloudy, the time information is evening, the date information is weekend, the brightness information is outdoors, and the attributes of the reproducing list set by the user is mood 1 at the point when the command to reproduce the music contents is input, the processor 140 may select Preset 1 400-1 that is the visualization effect changing method corresponding to the determined situation information, and apply the visualization effect changing method set to Preset 1 400-1 to change the visualization effect corresponding to the audio characteristics information.

If it is determined that the weather information is clear, the time information is afternoon, the date information is weekday, the brightness information is dark, and the attributes of the reproducing list set by the user is mood 2 and highlight at the time when the command to reproduce the same music contents is input, the processor 140 will select Preset N 400-N, that is the visualization effect changing method corresponding to the determined situation information, and apply the visualization effect changing method set to Preset N 400-N to change the visualization effect corresponding to the audio characteristics information.

For example, Preset 1 400-1 may be a visualization effect changing method of reducing the chroma of the background color, reducing the flickering speed of light and increasing the range of color change of the visualization effect corresponding to the audio characteristics information, and Preset N 400-N may be a visualization effect changing method of increasing the overall brightness of the visualization effect, and increasing the speed of motions of objects included in the visualization effect. However, this is just an example, and thus, any visualization effect changing method corresponding to the audio characteristics information by combining the situation information may be matched to each Preset 400-1 to 400-N.

Here, the visualization effect changing method set to each Preset may be preset by the manufacturing company when manufacturing the electronic device 100, but there is no limitation thereto, and thus, it is possible to display a UI for setting the visualization effect changing method according to the situation information, so that the user may set the visualization effect changing method through the corresponding UI.

Further, the visualization effect changing method selected from the table according to the situation information determined at the time point when the reproduce command is input may be applied in a lump sum to the changing of the visualization effect while the corresponding music contents are being reproduced.

Meanwhile, according to another embodiment of the present disclosure, the processor 140 may determine in real time the situation information while the music contents are being reproduced, and thus in the case where the situation information is changed while the music contents are being reproduced, it is possible to reflect the changed situation information and change the visualization effect.

For example, when the situation information is changed while the music is being reproduced, it is possible to select the visualization effect changing method corresponding to the changed situation information from the table once again, and apply the selected visualization effect changing method to the changing of the visualization effect corresponding to the audio characteristics information of the music contents currently being reproduced.

However, there is no limitation thereto, and according to another embodiment of the present disclosure, a separate visualization effect changing method may be matched to each situation information, and the processor 140 may change the visualization effect corresponding to the audio characteristics information using the visualization effect changing method corresponding to each situation information determined.

Table 1 illustrates an example of changing the visualization effect using the visualization effect changing method matched per situation information. As in the example of table 1, changing brightness of background may be matched to the weather information, changing the change range of color may be matched to the time information, changing flickering speed of light may be matched to the weather information, changing intensity of light may be matched to the brightness information, and changing chroma and effect may be matched to the information on attributes of the reproducing list.

In the example of table 1, the visualization effect corresponding to when the mood is "quiet mood", of the audio characteristics information corresponding to the music contents, is an image effect where a blue type background image is displayed and an animation object included in the image moves slowly, or a visual effect of flickering the LED lamp slowly.

Here, in the example of table 1, the processor 140 may change the visualization effect corresponding to the "quiet mood" by increasing the brightness of the blue background image and change it to be bright and clean since the weather information is "clear", by reducing the changing of color since the time information is "evening", by making no changes to the speed of flickering the LED lamp since the date information is "weekday", by subduing the intensity of light (by reducing the contrast of color, for example) since the brightness information is "dark", and increasing the chroma of the background image and applying a glamorous effect since the attributes of the reproducing list set by the user is "exciting attribute".

TABLE 1

| Mood | Quiet | Blue type, slow movement/flickering |
|---|---|---|
| Weather | Clear | Bright and clean background |
| Time | Evening | Reduce changing of color |
| Date | Weekday | No effect |
| Brightness | Dark | Subdued intensity of light |
| Attributes of the reproducing list | Exciting attribute | Increase chroma, apply glamorous effect |

Table 1 is just one example, and thus matching the visualization effect changing method per situation information is not limited to the example of table 1, and thus, there may be of course various types of visualization effect changing methods having each situation information as one type of visualization effect changing parameter.

Meanwhile, according to an embodiment, when changing an image effect based on the situation information, it will be possible to change the image effect by putting different weights for each situation information.

Accordingly, the processor 140 may control the visualization effect display 130 to display the visualization effect changed as aforementioned as the visualization effect of visualizing the corresponding music contents.

Since the music contents of the same sound source have the same audio characteristics information, the visualization effect corresponding to the audio characteristics information is generally the same as well regardless of the environment where corresponding music contents are being reproduced. However, by changing the visualization effect in consideration of the situation information on the environment where the corresponding music contents are to be reproduced, the user listening to the music contents becomes able to experience a more optimized and various music contents visualization effects according to situations.

Meanwhile, the aforementioned electronic device 100 is a device capable of reproducing music contents, determining situation information and displaying image effects of visualizing music contents, for example, smart phone, tablet PC, notebook, PMP, phablet, PDA (Personal Digital assistant), desktop PC, electronic picture frame and smart TV and the like, but without limitation. The electronic device 100 may not necessarily be a device configured in one form. For example, a multimedia reproducing system having a TV and a sound bar connected thereto may be included in the category of the electronic device 100 according to the present disclosure, wherein the TV displays image effects of visualizing music contents through its screen and the sound bar reproduces the music contents.

Figure 2A:
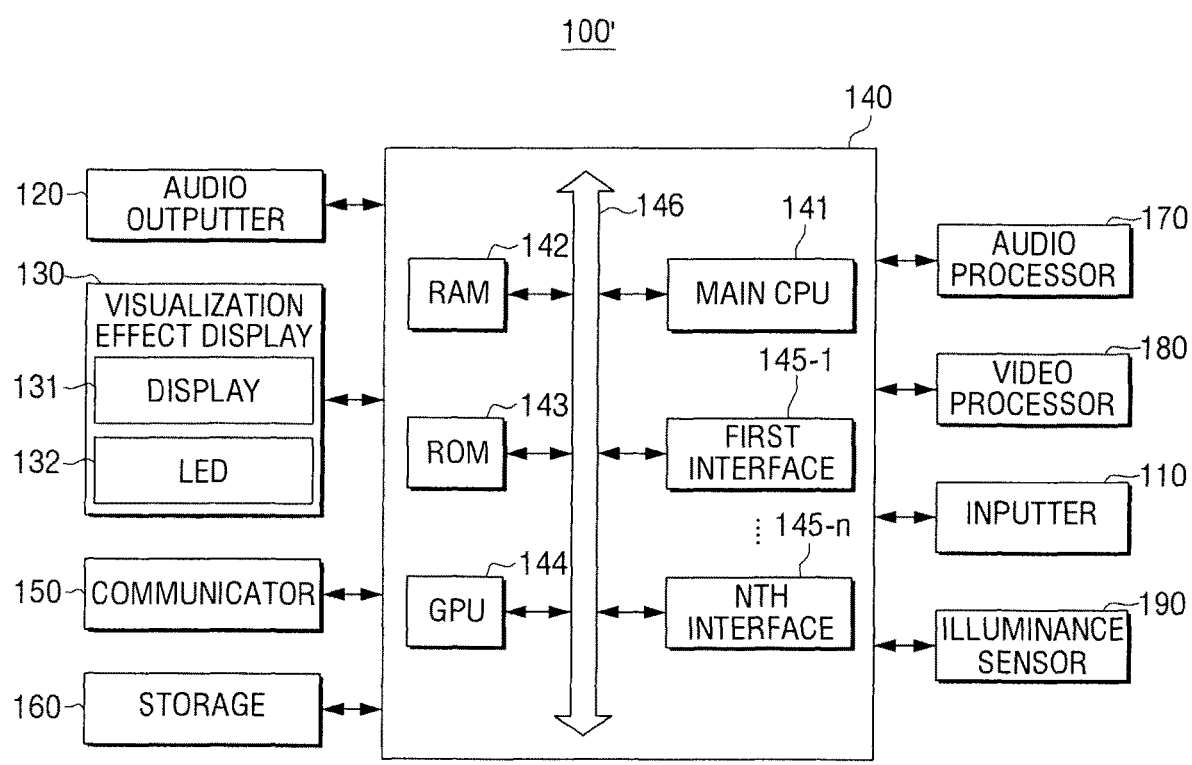
FIGS. 2A and 2B are a detailed block diagram of an electronic device according to an embodiment of the present disclosure.

FIG. 2A is a detailed block diagram of a configuration of an electronic device according to an embodiment of the present disclosure. In explaining FIG. 2A, contents overlapping with those aforementioned with reference to FIG. 1 will be omitted. According to FIG. 2A, the electronic device 100' may include an inputter 110, an audio outputter 120, a visualization effect display 130, a processor 140, a communicator 150, a storage 160, an audio processor 170, a video processor 180 and an illuminance sensor 190.

The visualization effect display 130 may include at least one of a display 131 and at least one LED 132.

Especially, the display 131 may display various images being input from various sources. The display 131 may display various images being obtained from broadcasting stations, external servers and external devices (CD and DVD player, etc.). Especially, the display 131 may display the image effect visualizing the music contents image-processed by the video processor 180, a mode selecting UI, a simple visualization setting UI, a smart visualization setting UI and the like according to a control by the processor 140.

The communicator 150 performs communication with external devices according to various types of communication methods. Especially, the communicator 150 may be connected to an external server via a network such as the Internet, and transceive various information. For example, the communicator 150 may perform communication with a server that provides audio characteristics information corresponding to the music contents.

Further, the communicator 140 may be connected to an external device in a short distance communication method, and receive information on the visualization effect set through a simple visualization setting UI and information on the situation information selected through a smart visualization setting UI displayed on the external device. Accordingly, the processor 140 may determine and change the visualization effect using the information received.

For this purpose, the communicator 150 may include at least one communication module of a short distance wireless communication module (not illustrated) and a wireless LAN communication module (not illustrated). Here, the short distance communication module (not illustrated) is a communication module for performing data communication wirelessly with an external device located within a short distance, for example, a Bluetooth module, a ZigBee module and an NFC module, etc.

Further, the wireless LAN communication module (not illustrated) is a module configured to be connectable to an external network according to a wireless communication protocol such as Wifi, IEEE and the like to perform communication. Besides the aforementioned, the communicator 150 may further include mobile communication modules configured to be connectable to a mobile communication network according to various mobile communication standards such as 3G (3rd Generation), 3GPP (3rd Generation Partnership Project), LTE (Long Term Evolution) and the like to perform communication.

Further, the communicator 150 may include at least one wired communication module (not illustrated) such as HDMI (High-Definition Multimedia Interface), USB (Universal Serial Bus), IEEE (Institute of Electrical and Eletronics Engineers) 1394 and RS-232, etc.

The illuminance sensor 190 senses the brightness of light, and outputs the sensed brightness as an electrical signal. The processor 140 may map a brightness level according to the output signal intensity and obtain information on brightness of the area surrounding the electronic device 100.

The storage 160 may store various programs and data necessary for operating the electronic device 100'. Further, the storage 160 may perform the function of temporarily storing data generated or obtained during the operation of the electronic device 100'.

Especially, the storage 160 may store various data and information such as the sound source of music contents, data of the visualization effect corresponding to the audio characteristics information, the table where the visualization effect changing method according to situation information is matched, information where a separate visualization effect changing method is matched for each situation information, audio characteristics information corresponding to the music content and various situation information, etc.

Figure 2B:
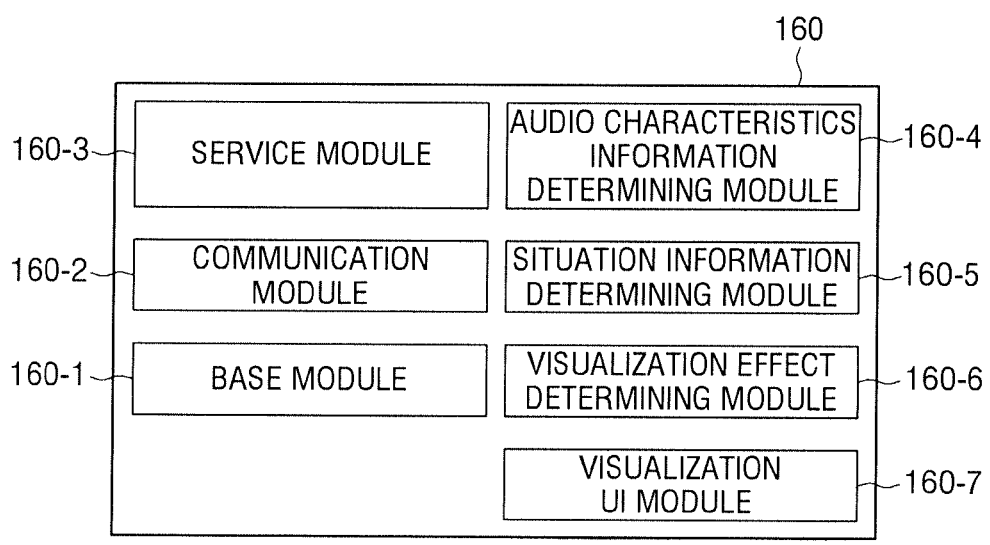

Further, as illustrated in FIG. 2B, the storage 160 may store various modules for driving the electronic device 100'. According to FIG. 2B, the storage 160 may store a base module 160-1, a communication module 160-2, a service module 160-3, an audio characteristics information determining module 160-4, a situation information determining module 160-5, a visualization effect determining module 160-6 and a visualization UI module 160-7, etc.

The base module 160-1 refers to a basic module for processing a signal being transmitted from each hardware included in the sound outputting device 100' and transmitting the signal to an upper layer module. The base module 160-1 may include a storage module, a security module and a network module (not illustrated), etc. The storage module (not illustrated) is a program module that manages a database (DB) or a registry. The security module (not illustrated) is a program module that supports certification, permission, secure storage and the like of hardware, and the network module (not illustrated) is a module for supporting network connection. The network module includes a DNET module and a UPnP module, etc.

The communication module 160-2 is a module for performing communication with outside. The communication module 160-2 may include a messaging module (not illustrated) and a telephone module (not illustrated).

The service module 160-3 is a module that includes various applications for providing various services.

The audio characteristics information determining module 160-4 is a module that determines the audio characteristics information on music contents. Specifically, the audio characteristics information determining module 160-4 may determine the audio characteristics information on the corresponding music contents. For example, the audio characteristics information determining module 160-4 may use various algorithms to analyze sound source sample data of the music contents for which the user's command to reproduce is input or of music contents in the reproducing list in frame units in a time and frequency area, and extract audio characteristics such as Energy, MFCC (Mel Frequency Cepstral Coefficients), Centroid, volume, energy, sub-band energy, low shot-time energy ratio, zero crossing rate, frequency centroid, frequency bandwidth, spectral flux, cepstral flux and loudness, etc.

Accordingly, the audio characteristics information determining module 160-4 may perform an arithmetic operation on the audio characteristics extracted or apply a machine learning method and the like to the audio characteristics extracted to compute and determine the audio characteristics information such as beat information, mood information, highlight information, onset information and tempo information, etc.

Further, the audio characteristics information determining module 160-4 may determine the audio characteristics information corresponding to the corresponding music contents by identifying the audio characteristics information on the music contents for which the command to reproduce is input of among the audio characteristics information corresponding to the music contents obtained from the external server and stored in the storage 160, and then extracting the identified audio characteristics information from the storage 160.

When the command to reproduce music contents is input, the situation information determining module 160-5 may determine the situation information that includes at least one of weather information, date information, time information, information on brightness of an area surrounding the electronic device and information on the attributes of the reproducing list. Specifically, the situation information determining module 160-5 may collect information on conditions for reproducing the music contents, surrounding situations and situations related to the environment through the user, sensor or Internet, and determine the same.

For example, the weather information may be determined by obtaining the same through synchronization with the external server providing the weather information. The date (information on holidays) and time information may be determined by obtaining the same through synchronization by a user's setting in the electronic device 100' or through an Internet time server. The brightness information may be determined by reading a value of the illuminance sensor 190 provided in the electronic device 100 and mapping a brightness level according to that value. The attributes of the reproducing list may be determined as the user obtains information on the attributes of the reproducing list selected from the music contents player.

The visualization UI module 160-7 is a module that generates and displays various UIs for selecting the music contents visualizing method or and for setting the visualization effect of visualizing the music contents.

Specifically, the visualization UI module 160-7 may generate and display a mode selecting UI for selecting one of the simple visualization mode that displays the visualization effect of visualizing music contents using only the audio characteristics of the music contents and the smart visualization mode that displays the visualization effect of visualizing music contents using both the audio characteristics information on the music contents and the situation information on the environment where the music contents are being reproduced.

Figure 5A:
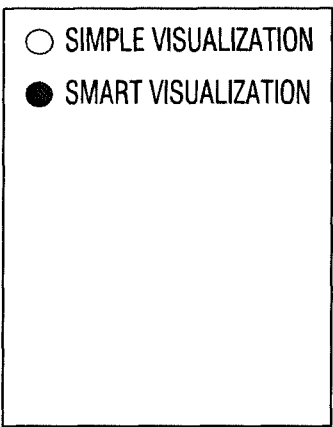
FIGS. 5A, 5B and 5C are an exemplary view of a mode selecting UI, a simple visualization setting UI and a smart visualization setting UI according to an embodiment of the present disclosure.
Figure 5B:
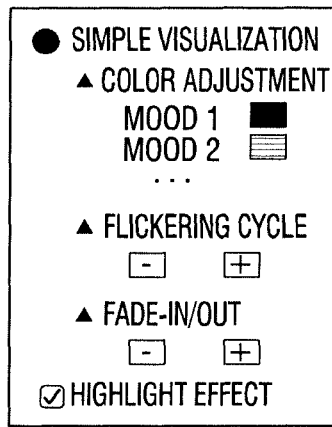
Figure 5C:
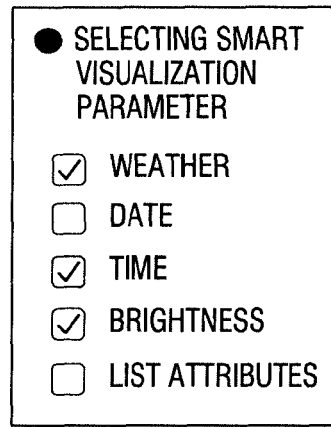

Further, the visualization UI module 160-7 may generate and display a simple visualization setting UI for setting the visualization effect corresponding to the audio characteristics information and a smart visualization setting UI for selecting the situation information that may be used to change the visualization effect. Examples of each UI are as illustrated in FIGS. 5A-5C.

The visualization effect determining module 160-6 is a module that displays the visualization effect of visualizing the music contents using the audio characteristics information on the music contents determined from the audio characteristics information determining module and the situation information on the environment where the music contents are being reproduced determined from the situation information determining module.

Specifically, the visualization effect determining module 160-6 may determine the visualization effect corresponding to the audio characteristics information, change the determined visualization effect according to the situation information, and display the changed visualization effect as the visualization effect of visualizing the music contents.

Further, the visualization effect determining module 160-6 may determine the visualization method or the visualization effect of the music contents according to a user's setting or selection on the various UIs being generated and displayed through the visualization UI module 160-7. Specifically, as aforementioned, when the simple visualization mode is selected from the mode selecting UI, the visualization effect determining module 160-6 may display the visualization effect of visualizing the music contents using only the audio characteristics information, and when the smart visualization mode is selected, the visualization effect determining module 160-6 may display the visualization effect finally changed using both the audio characteristics information the situation information as the visualization effect of visualizing the music contents.

Further, the visualization effect determining module 160-6 may determine the image effect set through the simple visualization setting UI as the visualization effect corresponding to the audio characteristics information, and change the determined visualization effect using the situation information selected through the smart visualization setting UI.

Operations of the electronic device 100' according to user's manipulations through the various UIs will be explained in detail hereinafter with reference to FIGS. 5A-5C.

Here, the storage 160 may be realized as various electronic devices such as a flash memory and a hard disk, etc. According to an embodiment, a virtual storage device on the network may also be included in the category of the storage 160.

The processor 140 may control the overall operations of the electronic device 100' using the various modules stored in the storage 160. As illustrated in FIG. 2A, the processor 140 includes a RAM 142, a ROM 143, a GUI 144, a main CPU 141, a first to nth interface 145-1~145-*n* and a bus 146.

Here, the RAM 142, the ROM 143, the GUI 144, the main CPU 141, the first to nth interface 145-1~145-*n* and the like may be connected to each other through the buses 146.

In the ROM 143, a command set and the like for system booting may be stored. When a turn-on command regarding the electronic device 100' is input and power is supplied, the CPU 141 copies an O/S stored in the storage 160, and executes the 0/S according to the command stored in the ROM 143 to boot the system. When the booting is completed, the CPU 141 copies various programs stored in the storage 160 to the RAM 142, and executes the programs copied in the RAM 142 to perform various operations. Especially, the main CPU 141 may perform various operations using the various programs modules, data and the like stored in the storage 160.

When the booting of the electronic device 100' is completed, the GPU 144 displays an image. Specifically, the GPU 144 may generate a screen that includes various objects such as an icon, an image, a text and the like using an arithmetic operation unit (not illustrated) and a rendering unit (not illustrated). The arithmetic operation unit (not illustrated) performs arithmetic operations on attribute values such as a coordinate value, a form, a size, a color and the like of each of the objects to be displayed according to a layout of the screen. The rendering unit (not illustrated) generates screens of various layouts that include the object based on the attribute value arithmetic-operated by the arithmetic unit (not illustrated). The screen generated in the rendering unit (not illustrated) is provided to the display 130 and is displayed within a display area.

The first to nth interface 145-1 to 145-*n* are connected to the various aforementioned elements 110, 120, 130, and 150 to 190. One of the interfaces may be a network interface connected to an external device through the network.

The audio processor 170 performs processing of audio data, and outputs the processed audio data to the audio outputter 120. Especially, the audio processor 170 may perform various processing operations on the audio data of the music contents such as decoding, amplifying, noise filtering and equalizing, etc.

The video processor 180 performs image processing of the image to be displayed through the display 130. Especially, the video processor 180 may perform image processing on the image effect of visualizing the music contents. Specifically, the video processor 170 may perform various image processing operations on the image effect of visualizing the music contents such as decoding, scaling, noise filtering, frame rate conversion and resolution conversion, etc.

Figure 3A:
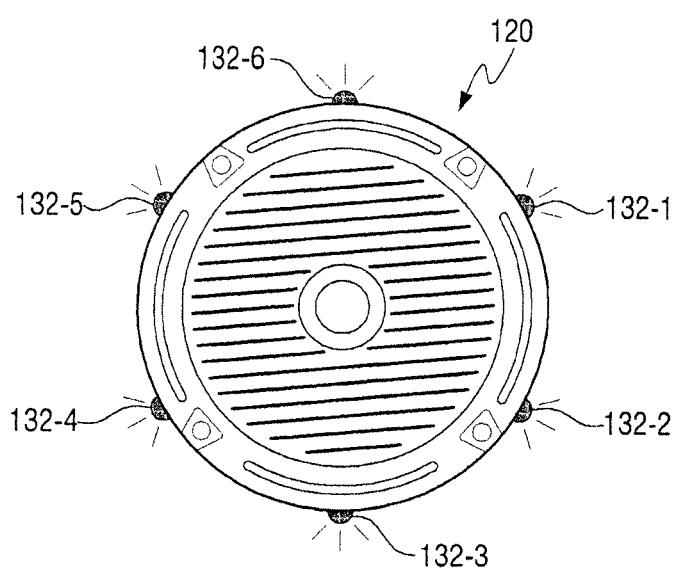
FIGS. 3A, 3B and 3C are an exemplary view provided to explain visualization effects of visualizing music contents according to an embodiment of the present disclosure.
Figure 3B:
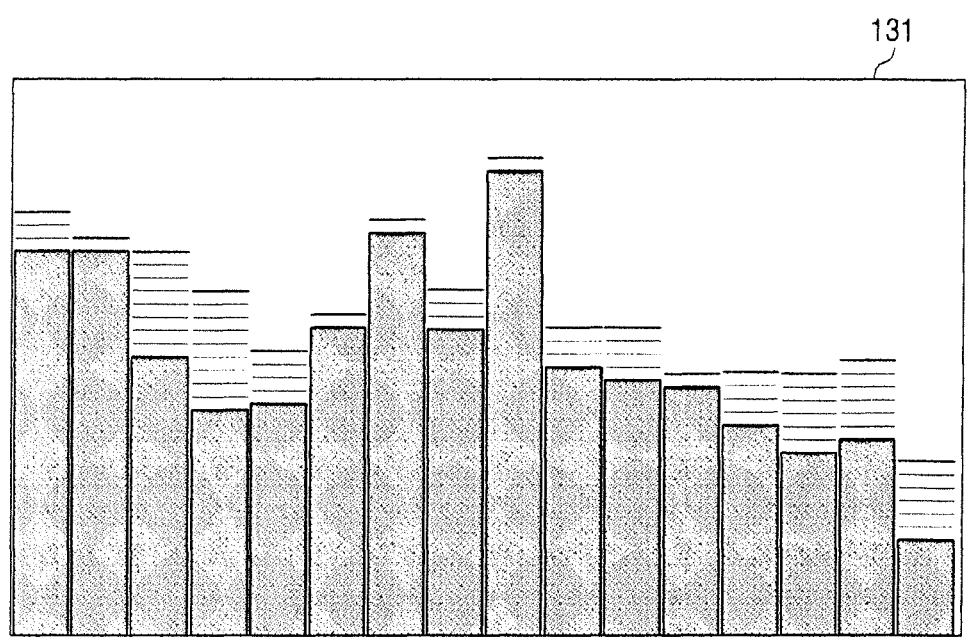
Figure 3C:
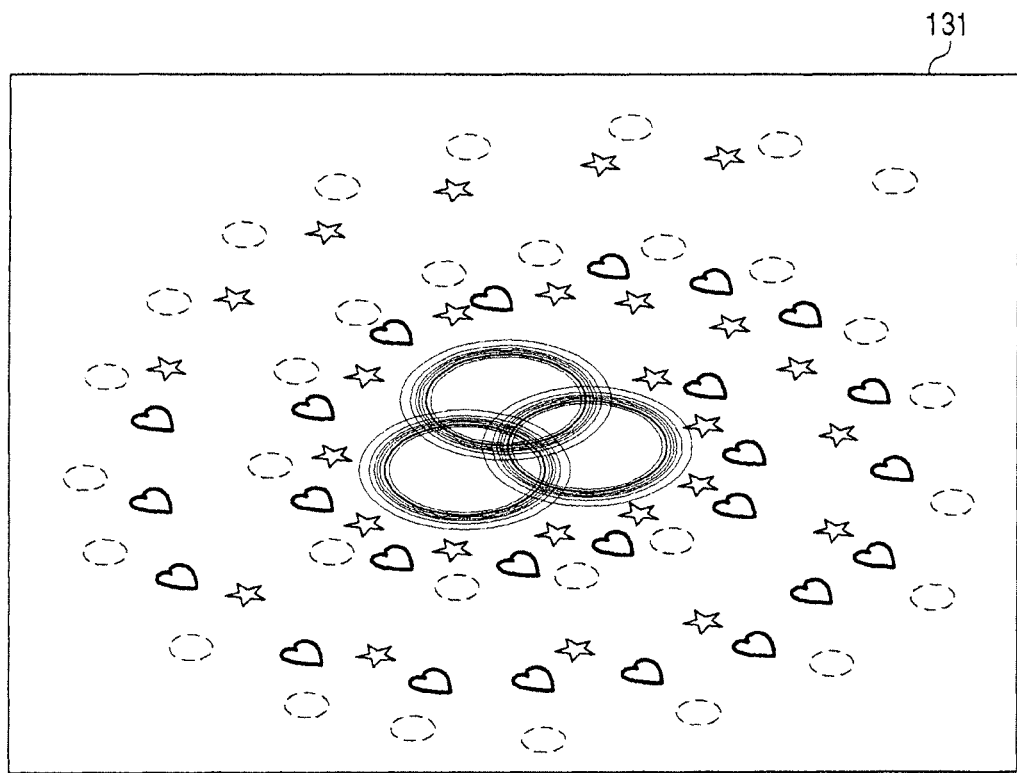

FIGS. 3A-3C are an exemplary view provided to explain the visualization effect of visualizing music contents according to an embodiment of the present disclosure.

Specifically, FIG. 3A illustrates the audio outputter 120 and at least one LED lamp 132-1 to 132-6 of the electronic device 100 according to an embodiment of the present disclosure.

As aforementioned, in the case where the visualization effect display 130 includes at least one LED lamp, when a command to reproduce music contents is input, the processor 140 may determine the visualization effect corresponding to the audio characteristics information on the corresponding music contents, for example, the visual effect of changing light emission of the at least one LED according to at least one of the beat information, mood information and highlight information of the corresponding music contents.

Therefore, in the case where the electronic device 100 operates in the simple visualization mode, the processor 120 may control the at least one LED lamp 132 to synchronize the determined visual effect with the reproducing of the corresponding music contents and to display the same. For example, as illustrated in FIG. 3A, the red color LED lamps 132-1 to 132-6 may be operated in the method of flickering according to beat.

However, in the case where the electronic device 100 operates in the smart visualization mode, the processor may change at least one of the color, brightness, chroma, contrast, speed of change and range of change of the visual effect determined using the situation information, and control at least one LED lamp 132 to display the changed visual effect as the visualization effect of the corresponding music contents. For example, unlike in FIG. 3A, the processor 140 may change the visual effect according to the situation information and control the LED lamps 132-1 to 132-6 to emit light such that the red color LED lamp is synchronized with the beat of the music contents and emit light while rotating from the left side sequentially. However, this is just an example, and thus the processor 140 may of course change the visual effect in other various methods using the situation information. Meanwhile, according to an embodiment of the present disclosure, the visualization effect display 130 may include a display 131. In this case, the visualization effect corresponding to the audio characteristics information of the music contents may be an image effect where a basic image of a certain theme changes according to the audio characteristics information. FIG. 3B illustrates an example of the image effect corresponding to the audio characteristics information displayed on the display 131. For example, as illustrated in FIG. 3B, in the case where the basic image of a certain theme is a bar graph per frequency band, the bar graph may change according to beat information, and the image effect of which the color of the bar graph is determined according to the mood information may be determined as the image effect corresponding to the audio characteristics information.

If the electrode device 100 is operating in the simple visualization mode, the processor 140 may control the display 131 to display the image effect where the green bar graph changes according to the beat information as the image effect of visualizing the music contents as illustrated in FIG. 3B.

However, in the case where the electronic device 100 is operating in the smart visualization mode, the processor 140 changes the image effect corresponding to the audio characteristics information according to the situation information and displays the same. Therefore, unlike the illustration in FIG. 3B, the processor 140 may control the display 131 to increase the brightness of an entirety of the bar graph image according to the information of the brightness surrounding the electronic device 100, or change the background surrounding the bar graph according to the date information, or to reflect the situation information such as by changing the color of the bar graph according to the time information or by increasing the range of changing of color, and to display the image effect.

Meanwhile, FIG. 3C illustrates an example of an image effect that may be applied according to the highlight information of the audio characteristics information. The highlight information is information on a highlight section of the music contents. The processor 140 may apply a more emphasized image effect to the highlight section. For example, sections besides the highlight section may display the image effect in one color whereas the highlight section emits light of two or more colors as illustrated in FIG. 3C. In this case as well, other highlight effects may of course be displayed on the highlight section of the music contents using the situation information.

Meanwhile, the visualization effect corresponding to the audio characteristics information is of course not limited to the aforementioned examples. For example, there may of course be a visualization effect where a transition time of color change differs depending on the mood information, a visualization effect where a motion speed of a pattern or animation included in the basic image is synchronized with a time point of a beat, and a visualization effect where flickering or a pattern of an LED lamp or an animation motion is made faster in a lively mood but made slower in a quiet mood.

FIGS. 5A-5C illustrate an example of various UIs according to an embodiment of the present disclosure. Specifically, FIG. 5A illustrates an example of the mode selecting UI. According to an embodiment of the present disclosure, the processor 140 may display the mode selecting mode UI for selecting one of the simple visualization mode and the smart visualization mode on the display 130, and when the simple visualization mode is selected from the displayed mode selecting UI, the processor 140 may control the display 130 to display the image effect of visualizing the music contents using only the audio characteristics information. In this case, the processor 130 may not determine the situation information.

However, as illustrated in the example of FIG. 5A, when the smart visualization mode is selected from the mode selecting UI, the processor 140 may determine the situation information according to the various aforementioned methods, and control the display 130 to reflect the determined situation information in the visualization effect corresponding to the audio characteristics information and display the visualization effect of visualizing the music contents.

Meanwhile, according to an embodiment of the present disclosure, as illustrated in FIG. 5B, the processor 140 may control the display 130 to display the simple visualization setting UI for setting the visualization effect corresponding to the audio characteristics information. According to FIG. 5B, the user may set a color of the visualization effect according to the mood and adjust the flickering cycle of the LED lamp through the simple visualization setting UI. Further, the user may adjust the transition time, and also select whether or not to apply the highlight effect.

Accordingly, the processor 140 may determine the visualization effect that the user set through the simple visualization setting UI as the visualization effect corresponding to the audio characteristics information. In the simple visualization mode, the visualization effect determined as aforementioned will be displayed as it is, and in the smart visualization mode, the visualization effect determined as aforementioned will be changed according to the situation information and be displayed.

Further, according to an embodiment of the present disclosure, as illustrated in FIG. 5C, the processor 140 may control the display 130 to display the smart visualization setting UI for selecting the situation information to be used to change the visualization effect. Referring to FIG. 5C, one can see that the user selected to change the visualization effect corresponding to the audio characteristics information using the weather information, time information and brightness information from among various situation information through the smart visualization setting UI.

Accordingly, the processor 140 may change the visualization effect corresponding to the audio characteristics information using only the weather information, time information and brightness information selected by the user from among the various situation information determined.

Meanwhile, according to an embodiment of the present disclosure, the simple visualization setting UI and the smart visualization setting UI may be displayed on an external device. Here, the external device may be any display device connected to the electronic device 100' wired or wirelessly.

Therefore, as the user sets the visualization effect from the simple visualization setting UI displayed on the external device and selects the situation information from the smart visualization setting UI, when the information on the set visualization effect and the information on the situation information are transmitted from the external device, the communicator 150 may receive those information as aforementioned.

Accordingly, the processor 140 may determine and change the visualization effect using the received information.

Further, the aforementioned mode selecting UI may also be displayed on the display device, and when the information on the selected mode is received through the communicator 150, the processor 140 may operate the electronic device 100 in the simple visualization mode or in the smart visualization mode according to the received information on the mode.

Figure 6A:
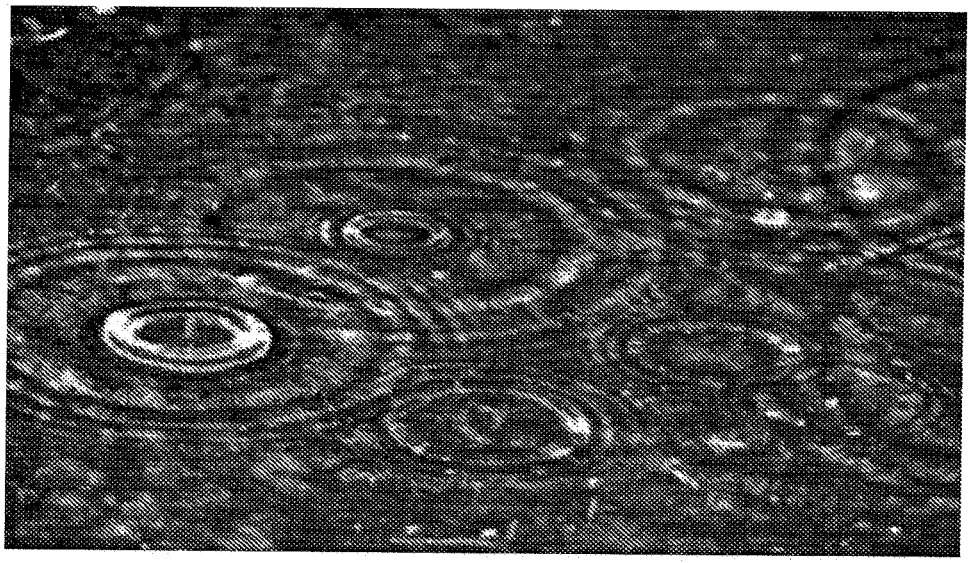
FIGS. 6A and 6B are an exemplary view where situation information is reflected in a visualization effect of visualizing music contents according to another embodiment of the present disclosure.
Figure 6B:
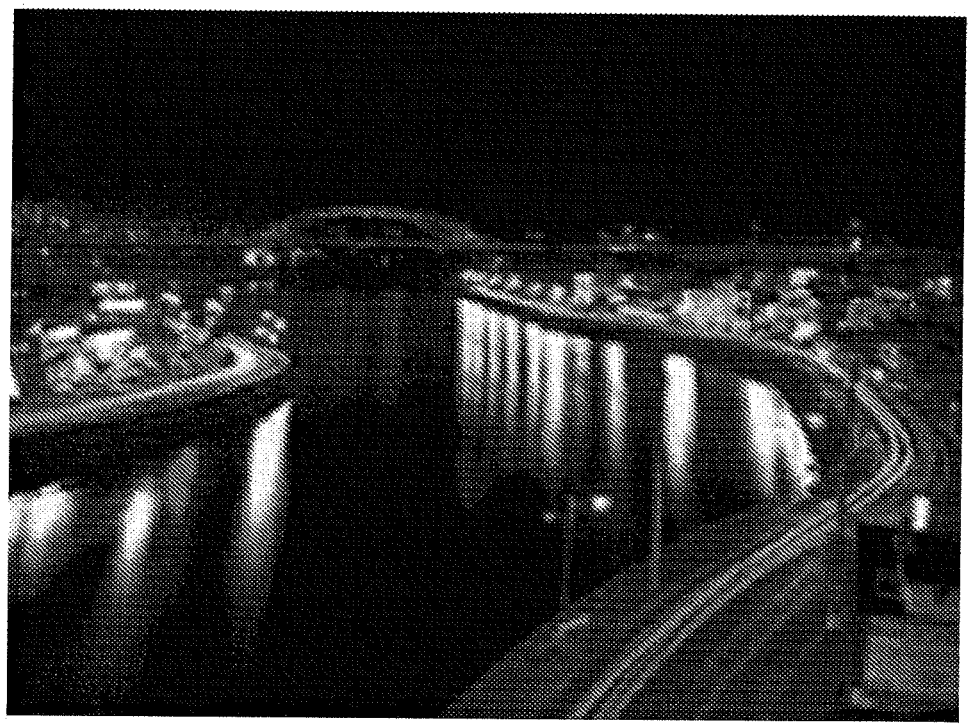

Meanwhile, according to another embodiment of the present disclosure, the situation information selected according to the smart visualization setting UI may be reflected in the image effect in the method of directly showing the corresponding situation information. FIGS. 6A, 6B illustrate such an example.

For example, when the weather information is selected on the smart visualization setting mode UI and the weather information is determined as "rain", the processor 140 may control the display 131 to reflect the image effect corresponding to the audio characteristics information (weather information) in an image where rain drops are falling and to display the same. More specifically, in the example of FIG. 6A, the processor 140 may control the display 131 to display the image effect directly showing the weather information in the method of synchronizing the waves that spread on water surface as the rain drops fall to the beat information.

Further, as illustrated in FIG. 6B, when the time information is selected on the smart visualization setting mode UI and the time information is determined as "evening", the time information may of course be shown directly in the method of synchronizing flickering of lights to the beat information having a night view image as the main theme.

However, the method of directly showing the situation information in the image effect is not limited to the aforementioned. For example, it is also possible to reflect the image effect corresponding to the audio characteristics information in the text directly expressing the situation information and display the same as the image effect visualization the music contents. Specifically for example, an embodiment of expressing the time according to time information in a text, and changing the color of each number in the time or synchronizing the flickering speed of each number to the beat of the music contents is also possible.

Hereinabove, explanation was made based on an example where the processor 140 first determines the visualization effect corresponding to the audio characteristics information on the music contents, and then changes the determined visualization effect using the situation information, but this is for convenience of explanation, and thus there is no limitation thereto. That is, the processor 140 may of course control the visualization effect display 130 to determine and apply the situation information and the audio characteristics information at the same time and display the visualization effect of visualizing the music contents.

Accordingly, the user may be provided with the visualization effect of visualizing the music contents while intuitively recognizing the situation information on the environment where the music contents are being reproduced.

Figure 7:
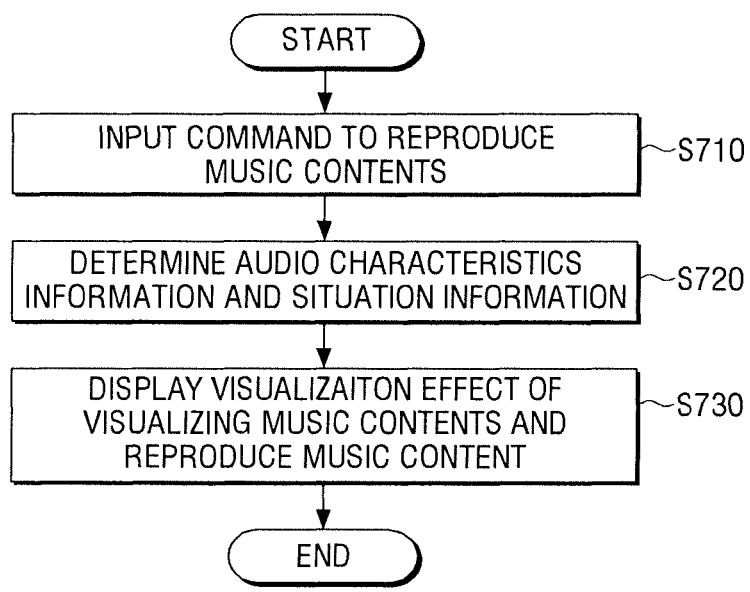
FIG. 7 is a flowchart illustrating a music contents visualization method of an electronic device according to an embodiment of the present disclosure.

FIG. 7 is a flowchart illustrating a music contents visualization method of an electronic device according to an embodiment of the present disclosure. According to FIG. 7, when a command to reproduce music contents is input (S710), the electronic device 100, 100' may determine the audio characteristics information on the music contents and the situation information on the environment where the music contents are being reproduced (S720).

Here, the audio characteristics information may include at least one of the beat information, mood information and highlight information of the music contents, and the situation information may include at least one of the weather information, date information, time information, information on brightness of surrounding areas of the electronic device 100, 100', and the information on attributes of the reproducing list set by the user.

Meanwhile, the electronic device 100, 100' may obtain the audio characteristics information on the music contents from the external server, or by directly analyzing the music contents. Further, the electronic device 100, 100' may obtain the situation information from the external device or from various sensors. Therefore, when the command to reproduce the music contents is input, the electronic device 100, 100' may determine the audio characteristics information and situation information at the time point when the command to reproduce the music contents is input or while the music contents are being reproduced.

Accordingly, the electronic device 100, 100' may display the visualization effect of visualizing the music contents using the determined audio characteristics information and situation information and reproduce the music contents (S730). Specifically, the electronic device 100, 100' may determine the visualization effect corresponding to the audio characteristics information, change the determined visualization effect based on the situation information, and display the changed visualization effect as the visualization effect of visualization the music contents.

Here, according to an embodiment of the present disclosure, the visualization effect corresponding to the audio characteristics information may be the image effect where the basic image of a certain them changes according to the audio characteristics information. Accordingly, the electronic device 100, 100' may change at least one of the basic image, background, color, brightness, chroma, speed of change and range of change of the visualization effect corresponding to the audio characteristics information based on the situation information.

Further, according to another embodiment of the present disclosure, the visualization effect corresponding to the audio characteristics information may be the visual effect where light emission of at least one LED lamp changes according to the audio characteristics information. In this case, the electronic device 100, 100' may change at least one of the color, brightness, chroma, speed of change and range of change of the visualization effect corresponding to the audio characteristics information based on the situation information.

Meanwhile, according to an embodiment of the present disclosure, the electronic device 100, 100' may determine the situation information of the time point when the command to reproduce is input. In this case, the electronic device 100, 100' may select the visual effect changing method corresponding to the situation information of the point when the command to reproduce is input from the prestored table where the visual effect changing method is matched, apply the selected visual effect changing method, and change the visual effect corresponding to the audio characteristics information.

Further, the electronic device 100, 100' may determine in real time the situation information while the music contents are being reproduced, reflect the situation information determined in real time and change the visual effect corresponding to the audio characteristics information.

Figure 8:
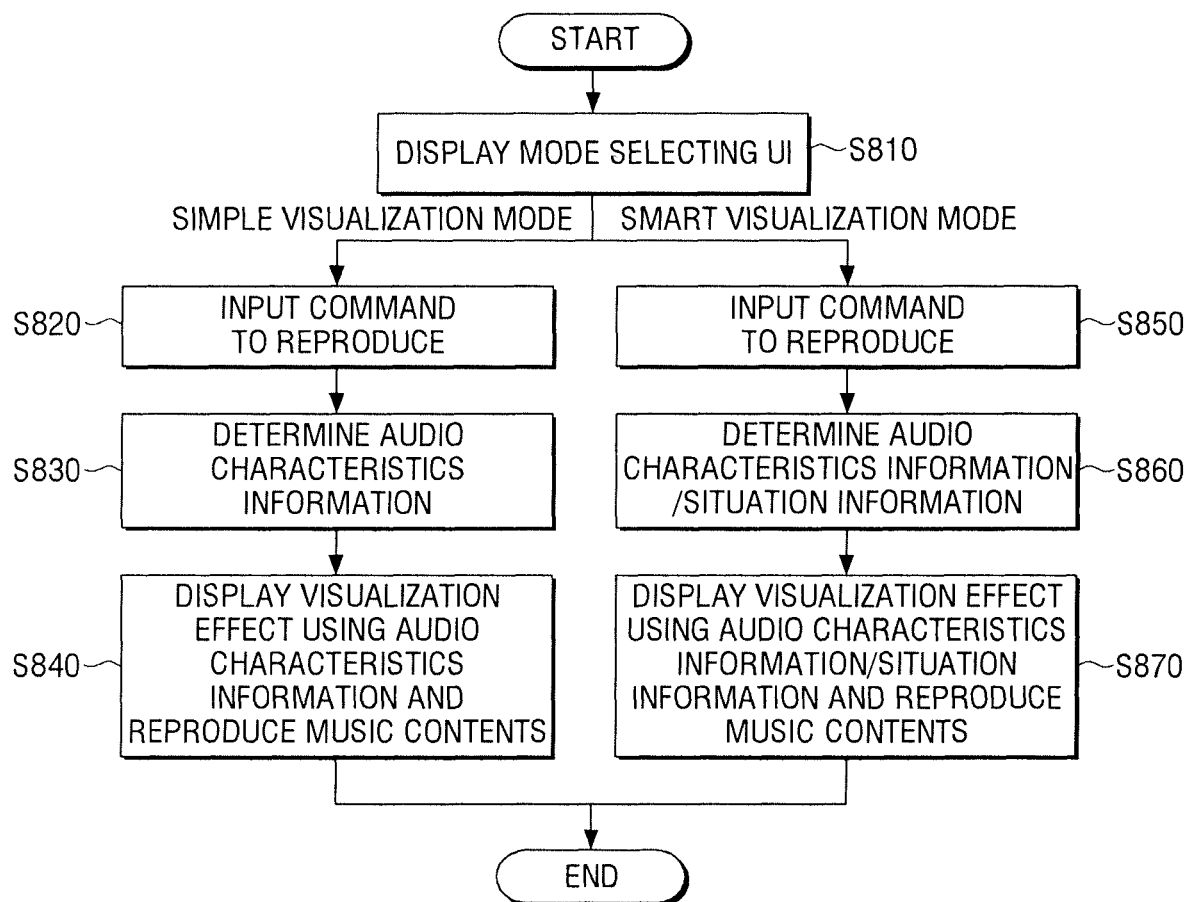
FIG. 8 is a flowchart illustrating a music contents visualization method of an electronic device according to another embodiment of the present disclosure.

FIG. 8 is a flowchart illustrating a music contents visualization method of an electronic device according to another embodiment of the present disclosure. According to FIG. 8, the electronic device 100, 100' displays the mode selecting UI (S810). Here, the mode selecting UI is a UI for selecting one of the simple visualization mode for using only the audio characteristics information and the smart visualization mode for using both the audio characteristics information and the situation information.

Accordingly, when the user selects the simple visualization mode and inputs a command to reproduce the music contents (S820), the electronic device 100, 100' determines the audio characteristics information on the music contents for which the command to reproduce is input (S830), and reproduces the music contents while displaying the visualization effect of visualizing the music contents using the audio characteristics information determined (S840).

Meanwhile, when the user selects the smart visualization mode, and inputs the command to reproduce the music contents (S850), the electronic device 100, 100' determines the audio characteristics information on the music contents and the situation information where the music contents are being reproduced (S860), and reproduces the music contents while displaying the visualization effect of visualizing the music contents using the audio characteristics information and the situation information determined (S870).

Meanwhile, according to another embodiment of the present disclosure, the electronic device 100, 100' displays at least one of the simple visualization setting UI for the user to set the visualization effect corresponding to the audio characteristics information and the smart visualization setting UI for the user to set the situation information used to change the visualization effect. Accordingly, when the user sets the visualization effect through the simple visualization setting UI, the electronic device 100, 100' determines the set visualization effect as the visualization effect corresponding to the audio characteristics information. Further, when the user selects the situation information through the smart setting UI, the electronic device 100, 100' changes the visualization effect corresponding to the audio characteristics information using the selected situation information.

Further, according to another embodiment of the present disclosure, the external device may display at least one of the mode selecting UI, the simple visualization setting UI and the smart visualization setting UI.

Accordingly, the electronic device 100, 100' may operate in at least one of the simple visualization mode or the smart visualization mode according to the mode selected through the mode selecting UI displayed on the external device.

Further, when the visualization effect is set through the simple visualization setting UI displayed on the external device, and information on the set visual effect is received, the electronic device 100, 100' may determine the received visual effect as the visualization effect corresponding to the audio characteristics information.

Further, when the situation information is selected through the smart visualization setting UI displayed on the external device, and the information on the selected situation information is received, the electronic device 100, 100' may change the visualization effect corresponding to the audio characteristics information using the information on the situation information received.

According to the aforementioned various embodiments, the effect of visualizing the music contents may be changed according to the environment where the music contents is reproduced. Accordingly, the user may experience various music contents visualization effects even when listening to the same music contents or music contents of a similar atmosphere.

Meanwhile, the operations of the processor 140 of the electronic device 100 or the music contents visualization methods of the electronic device according to the aforementioned various embodiments may be generated as software and mounted onto the electronic device 100 and may be performed by the processor 140.

For example, a non-transitory computer readable medium may be installed, the medium storing a program for performing the music contents visualization method including the step of inputting a command to reproduce music contents, a step of determining audio characteristics information on the music contents and situation information on the environment where the music contents are being reproduced and a step of displaying the visualizing effect of visualizing the music contents using the audio characteristics information and the situation information and reproducing the music contents.

Here, the non-transitory computer readable medium, executable by the processor 140, refers to not a medium that stores data for a short period of time such as a register, cache, memory and the like, but a medium readable by devices and that stores data semi-permanently. Specifically, the aforementioned various middleware or programs may be stored in a non-transitory computer readable medium such as a CD, DVD, hard disk, blue ray disk, USB, memory card, ROM and the like, and be provided.

The foregoing exemplary embodiments and advantages are merely exemplary and are not to be construed as limiting the present embodiments. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An electronic device, comprising:
    an input unit;
    an output unit;
    a display;
    a communicator; and
    a processor configured to:
        based on a user command for playing a content being received through the input unit, control the output unit to output a processed content,
        control the display to display a first screen corresponding to information of the content, and
        based on situation information being at least one of received through the communicator and included in the content, control the display to display a second screen corresponding to the information of the content and the situation information.

2. The electronic device according to claim 1,
wherein the content is music contents, and
wherein the processor is further configured to:
    based on the command to reproduce the music contents input through the input unit, determine audio characteristics information of the music contents and situation information of an environment where the music contents are being reproduced,
    determine a visualization effect corresponding to the audio characteristics information,
    change the visualization effect based on the situation information, and
    control the display to display a changed visualization effect as the visualization effect of visualizing the music contents, and
    control the output unit to reproduce the music contents.

3. The electronic device according to claim 2, wherein the visualization effect corresponding to the audio characteristics information is an image effect where a basic image of a theme changes according to the audio characteristics information, and the processor changes at least one of a basic image, a background, a color, a brightness, a chroma, a speed of change and a range of change of an image effect corresponding to the audio characteristics information based on the situation information.

4. The electronic device according to claim 2, wherein
the display comprises at least one LED (Light Emitting Diode) lamp,
the visualization effect corresponding to the audio characteristics information is a visual effect where light emission of the at least one LED lamp changes according to the audio characteristics information, and
the processor changes at least one of a color, a brightness, a chroma, a contrast, a speed of change and a range of change of the visualization effect corresponding to the audio characteristics information based on the situation information.

5. The electronic device according to claim 2, wherein
the audio characteristics information comprises at least one of beat information, mood information and highlight information of the music contents, and
the situation information comprises at least one of weather information, date information, time information, information on a brightness of an area surrounding the electronic device and information on attributes of a reproducing list.

6. The electronic device according to claim 2,
wherein the processor controls the display to display the visualization effect of visualizing the music contents using only the audio characteristics information in a simple visualization mode, and to display the visualization effect of visualizing the music contents using the audio characteristics information and the situation information in a smart visualization mode, of the simple visualization mode of using only the audio characteristics information and the smart visualization mode of using the audio characteristics information and the situation information.

7. The electronic device according to claim 2,
wherein the processor determines the visualization effect set through a simple visualization setting UI (user interface) for setting the visualization effect corresponding to the audio characteristics information as the visualization effect corresponding to the audio characteristics information, and
changes the visualization effect corresponding to the audio characteristics information using the situation information selected through a smart visualization setting UI for selecting the situation information to be used to change the visualization effect corresponding to the audio characteristics information.

8. The electronic device according to claim 7, wherein
the communicator is configured to communicate with an external device, and
the processor controls the display to, when information on the visualization effect set through the simple visualization setting UI and information on the situation information selected through the smart visualization setting UI are received from the external device, display the visualization effect of visualizing the music contents using the received information.

9. The electronic device according to claim 2,
wherein the processor determines in real time the situation information while the music contents are being reproduced, and reflects the situation information determined in real time to change the visualization effect corresponding to the audio characteristics information.

10. The electronic device according to claim 2,
wherein the processor determines the situation information at a time point when the command to reproduce the music contents is input, selects a visualization effect changing method corresponding to the situation information at the time point the command to reproduce the music contents is input from a prestored table where the visualization effect changing method according to the situation information is matched, and applies the selected visualization effect changing method to the determined visualization effect.

11. A music contents visualization method of an electronic device, the method comprising:
based on a user command for playing a content being received through an input unit, controlling an output unit to output a processed content,
controlling a display to display a first screen corresponding to information of the content, and
based on situation information being at least one of received through a communicator and included in the content, controlling the display to display a second screen corresponding to the information of the content and the situation information.

12. The method according to claim 11,
wherein the content is music contents, and
wherein the method further comprises:
based on the command to reproduce the music contents input through the input unit, determining audio characteristics information of the music contents and situation information of an environment where the music contents are being reproduced,
determining the visualization effect corresponding to the audio characteristics information;
changing the visualization effect to produce a determined visualization effect based on the situation information;
displaying a changed visualization effect as the visualization effect of visualizing the music contents, and reproducing the music contents.

13. The method according to claim 12,
wherein the visualization effect corresponding to the audio characteristics information is an image effect where a basic image of a theme changes according to the audio characteristics information, and
the changing of the determined visualization effect based on the situation information changes at least one of the basic image, a background, a color, a brightness, a chroma, a speed of change and a range of change of the visualization effect corresponding to the audio characteristics information based on the situation information.

14. The method according to claim 12,
wherein the visualization effect corresponding to the audio characteristics information is a visual effect where light emission of at least one LED (Light Emitting Diode) lamp changes according to the audio characteristics information, and
the changing of the determined visualization effect based on the situation information changes at least one of a color, a brightness, a chroma, a contrast, a speed of change and a range of change of the visualization effect corresponding to the audio characteristics information based on the situation information.

15. The method according to claim 12, wherein
the audio characteristics information comprises at least one of beat information, mood information and highlight information of the music contents, and
the situation information comprises at least one of weather information, date information, time information, information on a brightness of an area surrounding the electronic device and information on attributes of a reproducing list.

16. The method according to claim 12,
further comprising displaying a mode selecting UI (user interface) for selecting one of a simple visualization mode where the simple visualization mode uses only the audio characteristics information and a smart visualization mode where the smart visualization mode uses the audio characteristics information and the situation information,
wherein when the simple visualization mode is selected from the mode selecting UI, the visualization effect of visualizing the music contents using only the audio characteristics information is displayed, and when the smart visualization mode is selected, the visualization effect of visualizing the music contents using the audio characteristics information and the situation information is displayed.

17. The method according to claim 12, further comprising
determining the visualization effect set through a simple visualization setting UI (user interface) for setting the visualization effect corresponding to the audio characteristics information as the visualization effect corresponding to the audio characteristics information; and
changing the visualization effect corresponding to the audio characteristics information using the situation information selected through a smart visualization setting UI for selecting the situation information being used to change the visualization effect corresponding to the audio characteristics information.

18. The method according to claim 17,
further comprising receiving information on the visualization effect set through the simple visualization setting UI and information on the situation information selected through the smart visualization setting UI from an external device.

19. The method according to claim 12, wherein
the determining the situation information determines the situation information in real time while the music contents are being reproduced, and
the changing of the visualization effect reflects the situation information determined in real time to change the visualization effect corresponding to the audio characteristics information.

20. A non-transitory computer readable recording medium storing a program that is executable by a computer to perform a method of an electronic device authenticating a user, the method comprising:
based on a user command for playing a content being received through an input unit, controlling an output unit to output a processed content,
controlling a display to display a first screen corresponding to information of the content, and
based on situation information being at least one of received through a communicator and included in the content, controlling the display to display a second screen corresponding to the information of the content and the situation information.

\* \* \* \* \*